United States Patent
Greenfield et al.

(10) Patent No.: US 7,069,388 B1
(45) Date of Patent: Jun. 27, 2006

(54) CACHE MEMORY DATA REPLACEMENT STRATEGY

(75) Inventors: Zvi Greenfield, Kfar Saba (IL); Dina Treves, Kfar Saba (IL); Gil Zukerman, Hod HaSharon (IL)

(73) Assignee: Analog Devices, Inc., Norwood, MA (US)

( * ) Notice: Subject to any disclaimer, the term of this patent is extended or adjusted under 35 U.S.C. 154(b) by 302 days.

(21) Appl. No.: 10/616,549

(22) Filed: Jul. 10, 2003

(51) Int. Cl.
*G06F 12/08* (2006.01)

(52) U.S. Cl. ...................... 711/133; 711/128
(58) Field of Classification Search ........... 711/133, 711/136, 128, 134, 144
See application file for complete search history.

(56) References Cited

U.S. PATENT DOCUMENTS

| | | | |
|---|---|---|---|
| 6,185,657 B1 * | 2/2001 | Moyer | ........................ 711/128 |
| 6,327,643 B1 | 12/2001 | Egan | |
| 6,405,287 B1 | 6/2002 | Lesartre | |
| 6,490,654 B1 | 12/2002 | Wickeraad et al. | |
| 2001/0014931 A1 * | 8/2001 | Aglietti et al. | .............. 711/129 |

\* cited by examiner

*Primary Examiner*—Hiep T. Nguyen
(74) *Attorney, Agent, or Firm*—Wolf, Greenfield & Sacks, P.C.

(57) ABSTRACT

A method for caching specified data in an n-way set associative memory with a copy-back update policy consists of the following steps. First, a row of the associative memory, organized as a plurality of rows and having n ways per row, is selected according to the main memory address of the specified data. The main memory provides primary storage for the data being cached. If one of the ways of the selected row holds invalid data, the specified data is cached in the way holding the invalid data and the data caching process is discontinued. If all n ways of the selected row hold valid data, the following steps are performed. First, a replacement strategy is used to select a way from the selected row. If the way selected in accordance with the replacement strategy holds unmodified data, the specified data is cached in the way selected by the replacement strategy and the data caching process is discontinued. However, if the way selected by the replacement strategy holds modified data, the ways of the selected row are examined again to find a way that holds data from the currently open page of the main memory. If such at least one such way is found, the specified data is cached in one of the ways holding data from the open page, and the data caching process is discontinued. Finally, if none of the ways in the selected row meet the above criteria, the specified data is cached in the way previously selected by the replacement algorithm, and the method terminates.

43 Claims, 8 Drawing Sheets

| ROW | WAY 1 | | | | | WAY 2 | | | | |
|---|---|---|---|---|---|---|---|---|---|---|
| | Tag | Data | Dirty | Valid | Other | Tag | Data | Dirty | Valid | Other |
| 1 | | | | | | | | | | |
| 2 | | | | | | | | | | |
| 3 | | | | | | | | | | |
| 4 | | | | | | | | | | |
| ⋮ | | | | | | | | | | |
| M | | | | | | | | | | |

Figure 2

CACHE MEMORY DATA REPLACEMENT STRATEGY

FIELD AND BACKGROUND OF THE INVENTION

The present invention relates to a cache memory data replacement strategy and, more particularly, to a data replacement strategy for an n-way set associative cache memory.

Memory caching is a widespread technique used to improve data access speed in computers and other digital systems. Cache memories are small, fast memories holding recently accessed data and instructions. Caching relies on a property of memory access known as temporal locality. Temporal locality states that information recently accessed from memory is likely to be accessed again soon. When an item stored in main memory is required, the processor first checks the cache to determine if the required data or instruction is there. If so, the data is loaded directly from the cache instead of from the slower main memory. Due to temporal locality, a relatively small cache memory can significantly speed up memory accesses for most programs.

FIG. 1 illustrates a processing system 100 in which the system memory 110 is composed of both a fast cache memory 120 and a slower main memory 130. When processor 140 requires data from the system memory 110, the processor first checks the cache memory 120. Only if the memory item is not found in the cache memory 120 is the data retrieved from the main memory 130. Thus, data which was previously stored in the cache memory 120 can be accessed quickly, without accessing the slow main memory 130.

Cache memories must also handle the problem of ensuring that both the cache memory and the main memory are kept current when changes are made to data values that are stored in the cache memory. Cache memories commonly use one of two methods, write-through and copy-back, to ensure that the data in the system memory is current and that the processor always operates upon the most recent value. The write-through method updates the main memory whenever data is written to the cache memory. With the write-through method, the main memory always contains the most up to date data values. The write-through method, however, places a significant load on the data buses, since every data update to the cache memory requires updating the main memory as well. The copy-back method, on the other hand, updates the main memory only when modified data in the cache memory is replaced. When data stored in the cache memory is modified by a connected processor, the processor updates only the data in the cache memory. When cached data is replaced, the main memory value is changed only if the data has been modified while being cached, that is if the main memory and cache memory values are different. The cache memory commonly stores an indicator, known as the dirty bit, for each location in the cache memory. The dirty bit shows whether the data in that location should be updated in main memory when the data is replaced in the cache. Copy-back caching saves the system from performing many unnecessary write cycles to the main memory, which can lead to noticeably faster execution.

There are currently three prevalent mapping strategies for cache memories: the direct mapped cache, the fully associative cache, and the n-way set associative cache. In the direct mapped cache, a portion of the main memory address of the data, known as the index, completely determines the location in which the data is cached. The remaining portion of the address, known as the tag, is stored in the cache along with the data. To check if required data is stored in the cached memory, the processor compares the main memory address of the required data to the main memory address of the cached data. As the skilled person will appreciate, the main memory address of the cached data is generally determined from the tag stored in the location required by the index of the required data. If a correspondence is found, the data is retrieved from the cache memory, and a main memory access is prevented. Otherwise, the data is accessed from the main memory. The drawback of the direct mapped cache is that the data replacement rate in the cache is generally high, thus reducing the effectiveness of the cache.

The opposite policy is implemented by the fully associative cache, in which cached information can be stored in any row. The fully associative cache alleviates the problem of contention for cache locations, since data need only be replaced when the whole cache is full. In the fully associative cache, however, when the processor checks the cache memory for required data, every row of the cache must be checked against the address of the data. To minimize the time required for this operation, all rows are checked in parallel, requiring a significant amount of extra hardware.

The n-way set associative cache memory is a compromise between the direct mapped cache and the fully associative cache. Like the direct mapped cache, in a set-associative cache the index of the address is used to select a row of the cache memory. However, in the n-way set associative cache each row contains n separate ways, each one of which can store the tag, data, and any other required indicators. In an n-way set associative cache, the main memory address of the required data is checked against the address associated with the data in each of the n ways of the selected row, to determine if the data is cached. The n-way set associative cache reduces the data replacement rate (as compared to the direct mapped cache) and requires only a moderate increase in hardware.

When an n-way set associative cache is used, a replacement strategy must be selected for determining which of the n ways is replaced when data is written to a row where all of the ways contain valid data. The way to be replaced may be selected randomly, but it has been found that in many cases a replacement scheme known as LRU (least recently used) is more effective. LRU takes advantage of the temporal locality property, and assumes that the data that is least likely to be needed in the future is the data that has not been used (i.e. read from or written to in the cache) for the longest period of time. With LRU, the cache memory records the relative order in which the data in each of the ways was used, for every row in the cache memory. When data is replaced in a given row, the processor uses this information to determine which of the ways contains the least recently used data, and replaces the data accordingly.

In many cases LRU is an effective replacement strategy. However LRU fails to account for certain factors that may influence the time required for data replacement. One of these factors is the type of memory hardware used for the main memory. Some memory chips, for example dynamic random access memories (DRAMs), have a page structure. The time required for a memory read/write operation depends on the page to which the operation is directed. In a DRAM, read and write operations can only be performed on the currently open page. When a read or write operation is required to a closed page, the required page is first opened by latching to a page buffer in an activation cycle. Read/write operations can then be performed to the open page. In order to subsequently perform a read/write to a different, currently closed, page, the open page is first closed with a precharge cycle, and the new page is then latched to the page buffer with a second activate cycle. It is therefore more efficient to read and write data to the currently open page than to a new page. The time required for each read/write operation to a new, currently closed, page is three cycles, as opposed to a single cycle for a read/write operation to a currently open page.

Many replacement policies have been proposed, however they do not take the main memory status into consideration when optimizing the data replacement strategy. For example, Wickeraad, et al. in U.S. Pat. No. 6,490,654 present a method and apparatus for cache line (way) replacement which associates a count entry with each cache line. The count entry defines a replacement class for the line. Data which is likely to be needed soon is assigned a higher replacement class, while data that is more speculative and less likely to be needed soon is assigned a lower replacement class. When the cache memory becomes full, the replacement algorithm selects for replacement those cache lines having the lowest replacement class. Accordingly, the cache lines selected for replacement contain the most speculative data in the cache. Wickeraad, et al. base their replacement strategy only upon a predicted likelihood that the cached information will be needed, without consideration of main memory constraints.

A prior art replacement strategy based on the status of the cache memory is presented in Egan U.S. Pat. No. 6,327,643, which provides a system and method for cache line replacement that differentiates between cache lines that have been written with those that have not been written. The replacement algorithm attempts to replace cache lines that have been previously written back to memory. If there are no written cache lines available, the algorithm attempts to replace cache lines that are currently on page and on bank within the cache memory. The invention considers only the state of the cache memory, not the state of the main memory.

Lesartre in U.S. Pat. No. 6,405,287 provides a cache line replacement strategy that uses cached data status to bias way selection, and to determine which way of an n-way set associative cache should be filled with replacement data when all of the ways contain valid data. According to Lesartre's method, a first choice for way selection and at least one additional choice for way selection are generated. If the status of the way corresponding to the first choice differs from a bias status, a way corresponding to one of the additional choices is designated as the way to be filled with replacement data. Otherwise, the way corresponding to the first choice is designated as the way to be filled with replacement data. Status information for a given way may include any data which is maintained on a cache line by cache line basis, but is preferably data which is maintained for purposes other than way selection. Cache line status information is defined as any information which is tracked in conjunction with the maintenance of a cache line. For example, status information might include indications as to whether a cache line is shared or private, clean or dirty. The above method takes the way status into consideration, but does not account for factors that are not specific to the cache line, such as the ongoing status of the main memory.

There is thus a widely recognized need for, and it would be highly advantageous to have, a cache memory replacement strategy devoid of the above limitations.

SUMMARY OF THE INVENTION

According to a first aspect of the present invention there is provided a method for caching specified data in an n-way set associative memory with a copy-back update policy which consists of the following steps. First, a row of the associative memory, organized as a plurality of rows and having n ways per row, is selected according to the main memory address of the specified data. The main memory provides primary storage for the data being cached. If one of the ways of the selected row holds invalid data, the specified data is cached in the way holding the invalid data and the data caching process is discontinued. If all n ways of the selected row hold valid data, the following steps are performed. First, a replacement strategy is used to select a way from the selected row. If the way selected in accordance with the replacement strategy holds unmodified data, the specified data is cached in the way selected by the replacement strategy and the data caching process is discontinued. However, if the way selected by the replacement strategy holds modified data, the ways of the selected row are examined again to find a way that holds data from the currently open page of the main memory. If such at least one such way is found, the specified data is cached in one of the ways holding data from the open page, and the data caching process is discontinued. Finally, if none of the ways in the selected row meet the above criteria, the specified data is cached in the way previously selected by the replacement algorithm, and the method terminates.

Preferably, the main memory comprises a DRAM (dynamic random access memory).

Preferably, the first predetermined replacement strategy comprises a least recently used (LRU) replacement strategy.

Preferably, the method contains the further steps of: if a single way of the selected row contains data from the currently open page the specified data is cached in the single way that was found, and the data caching process is discontinued. However, if a plurality of ways of the selected row contain data from the currently open page of the main memory, one of these ways is selected to a second predetermined replacement strategy. The specified data is then cached in the way that was selected by the second replacement strategy, and the data caching process is discontinued.

Preferably, the second predetermined replacement strategy comprises a least recently used (LRU) replacement strategy.

Preferably, the method contains the further step of updating a current page indicator to indicate the currently open page of the main memory.

Preferably, the method contains the further step of locking a way so as to prevent data caching in the locked way.

Preferably, the method contains the further step of writing data replaced in the associative memory to the main memory.

Preferably, the method contains the further step of writing data replaced in the associative memory to a buffer memory.

Preferably, the method contains the further step of analyzing a tag and row of a specified way to substantially determine if the specified way comprises data from the currently open page.

According to a second aspect of the present invention there is provided a method for caching specified data in an n-way set associative memory with a copy-back update policy which consists of the following steps. First, a row of the associative memory, organized as a plurality of rows and having n ways per row, is selected according to the main memory address of the specified data. The main memory provides primary storage for the data being cached. If one of the ways of the selected row holds data from a currently open page of the main memory, the specified data is cached in the way holding the data from a currently open page of the main memory and the data caching process is discontinued. If none of the n ways of the selected row hold data from a currently open page of the main memory, the following steps are performed. First, a replacement strategy is used to select a way from the selected row. Then the specified data is cached in the way selected by the replacement algorithm, and the method terminates.

Preferably, the main memory comprises a DRAM.

Preferably, the method contains the further step of: if a second way of the selected row comprises invalid data, caching the specified data in the second way and discontinuing the data caching process.

Preferably, the first predetermined replacement strategy comprises a least recently used (LRU) replacement strategy.

Preferably, the method contains the further steps of: if a single way of the selected row contains data from the currently open page, caching the specified data in the single way and discontinuing the data caching process. However, if a plurality of ways of the selected row contain data from the currently open page of the main memory, the following steps are performed: a way is selected from amongst the plurality of ways according to a second predetermined replacement strategy. The specified data is cached in the way selected by the second predetermined replacement strategy, and the data caching process is discontinued.

Preferably, the second predetermined replacement strategy comprises a least recently used (LRU) replacement strategy.

Preferably, the method contains the further step of updating a current page indicator to indicate the currently open page of the main memory.

Preferably, the method contains the further step of locking a way so as to prevent data caching in the locked way.

Preferably, the method contains the further step of writing data replaced in the associative memory to the main memory.

Preferably, the method contains the further step of writing data replaced in the associative memory to a buffer memory.

Preferably, the method contains the further step of analyzing a tag and row of a specified way to substantially determine if the specified way comprises data from the currently open page.

According to a third aspect of the present invention there is provided a method for caching specified data in an n-way set associative memory with a copy-back update policy which consists of the following steps. First, a row of the associative memory, organized as a plurality of rows and having n ways per row, is selected according to the main memory address of the specified data. The main memory provides primary storage for the data being cached. If one of the ways of the selected row holds invalid data, the specified data is cached in the way holding the invalid data and the data caching process is discontinued. If all n ways of the selected row hold valid data, the following steps are performed. First, the main memory is analyzed to determine a main memory status. Next, a way is selected from the selected row in accordance with the main memory status. Finally, the specified data is cached in the way selected according to main memory status, and the method terminates.

Preferably, analyzing the main memory status comprises determining a currently open page of the main memory.

Preferably, the main memory comprises a DRAM.

According to a fourth aspect of the present invention there is provided a way selector system. The way selector system comprises a way selector which selects a way in which to cache specified data. The main memory provides primary storage for the data being cached. The data is cached in an n-way set associative memory with a copy-back update policy. The associative memory is organized in a plurality of rows, where each row contains n ways. The associative memory is a fast memory for caching main memory data for easy external access. The specified data for caching originates from the main memory and from external agents connected to the main memory via the associative memory. The way selector contains an invalid data detector, a replacement selector, an open page identifier, and an analyzer. The invalid data detector detects a way in the selected row that contains invalid data. The replacement selector selects a way of the selected row according to a first predetermined replacement strategy. The open page identifier identifies a way of the selected row that contains data from a currently open page of a main memory. The analyzer chooses one of the n ways for data replacement. The analyzer is connected to the invalid data detector, the replacement selector, the modified data detector, and the open page identifier.

Preferably, the main memory comprises a DRAM.

Preferably, the way selector system further contains a row selector, for selecting a row of the associative memory according to an address of the specified data.

Preferably, the way selector system further contains a modified data detector, for detecting if a way of the selected row comprises modified data.

Preferably, the open page identifier comprises a page detector for analyzing a tag and row of a specified way to determine a main memory page that is associated with data stored in the way.

Preferably, the way selector system further contains a current page indicator for indicating the currently open page of the main memory.

Preferably, the way selector system further contains a secondary selector for selecting a way from amongst a plurality of ways comprising data from the currently open page of the main memory according to a second predetermined replacement strategy.

Preferably, the first predetermined replacement strategy comprises a least recently used (LRU) replacement strategy.

Preferably, the second predetermined replacement strategy comprises a least recently used (LRU) replacement strategy.

Preferably, the way selector system contains a way locker for locking a way so as to prevent data caching in the locked way.

Preferably, the way selector system contains a data cacher for caching the specified data in the chosen way of the selected row.

Preferably, the way selector system contains an n-way set associative memory.

Preferably, the way selector system contains a buffer memory for storing the data replaced in the associative memory prior to writing the replaced data to the main memory.

Preferably, the way selector system further contains a strategy selector for selecting an application-specific first replacement strategy.

Preferably, the strategy selector is further operable to select an application-specific second replacement strategy.

According to a fifth aspect of the present invention there is provided a way selector system. The way selector system comprises a way selector that selects a way in which to cache specified data. The main memory provides primary storage for the data being cached. The data is cached in an n-way set associative memory with a copy-back update policy. The associative memory is organized in a plurality of rows, where each row contains n ways. The associative memory is a fast memory for caching main memory data for easy external access. The specified data for caching originates from the main memory and from external agents connected to the main memory via the associative memory. The way selector contains an open page identifier, a replacement selector, and an analyzer. The open page identifier identifies a way of the selected row that contains data from a currently open page of a main memory. The replacement selector selects a way of the selected row according to a predetermined replacement strategy. The analyzer chooses one of the n ways for data replacement. The analyzer is connected to the replacement selector and the open page identifier.

According to a sixth aspect of the present invention there is provided a way selector system. The way selector system comprises a way selector that selects a way in which to cache specified data. The main memory provides primary storage for the data being cached. The data is cached in an n-way set associative memory with a copy-back update policy. The associative memory is organized in a plurality of rows, where each row contains n ways. The associative memory is a fast memory for caching main memory data for easy external access. The specified data for caching originates from the main memory and from external agents connected to the main memory via the associative memory. The way selector contains a main memory status checker for monitoring main memory status, and an analyzer for choosing one of the n ways for data replacement. The analyzer is associated with the main memory status checker.

According to a seventh aspect of the present invention there is provided a method for caching specified data in an n-way set associative memory with a copy-back update policy which consists of the following steps. First, an application specific replacement strategy is selected. Next, a row of the associative memory, which is organized as a plurality of rows and having n ways per row, is selected according to the main memory address of the specified data. The main memory provides primary storage for the data being cached. If one of the ways of the selected row holds invalid data, the specified data is cached in the way holding the invalid data and the data caching process is discontinued. If all n ways of the selected row hold valid data, the following steps are performed. First, the selected application specific replacement strategy is used to select a way from the selected row. If the way selected in accordance with the application specific replacement strategy holds unmodified data, the specified data is cached in the way selected by the replacement strategy and the data caching process is discontinued. However, if the way selected by the replacement strategy holds modified data, the ways of the selected row are examined again to find a way that holds data from the currently open page of the main memory. If at least one such way is found, the specified data is cached in one of the ways holding data from the open page, and the data caching process is discontinued. Finally, if none of the ways in the selected row meet the above criteria, the specified data is cached in the way previously selected by the replacement algorithm, and the method terminates.

Preferably, the method contains the further step of selecting an application-specific second replacement strategy.

Preferably, the method contains the further steps of: if a single way of the selected row contains data from the currently open page, the specified data is cached in the single way and the data caching process is discontinued. However, if a plurality of ways of the selected row are found to contain data from the currently open page of the main memory the following steps are performed: a third way is selected from amongst the plurality of ways according to the second replacement strategy, the specified data is cached in the third way, and the data caching process is discontinued.

The present invention successfully addresses the shortcomings of the presently known configurations by providing a replacement strategy that incorporates main memory status considerations (in particular the currently open page of the main memory), to reduce the time required for updating the main memory when cached data is replaced.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2 illustrates the organization of a 2-way set associative memory.

DESCRIPTION OF THE PREFERRED EMBODIMENTS

Figure 1:
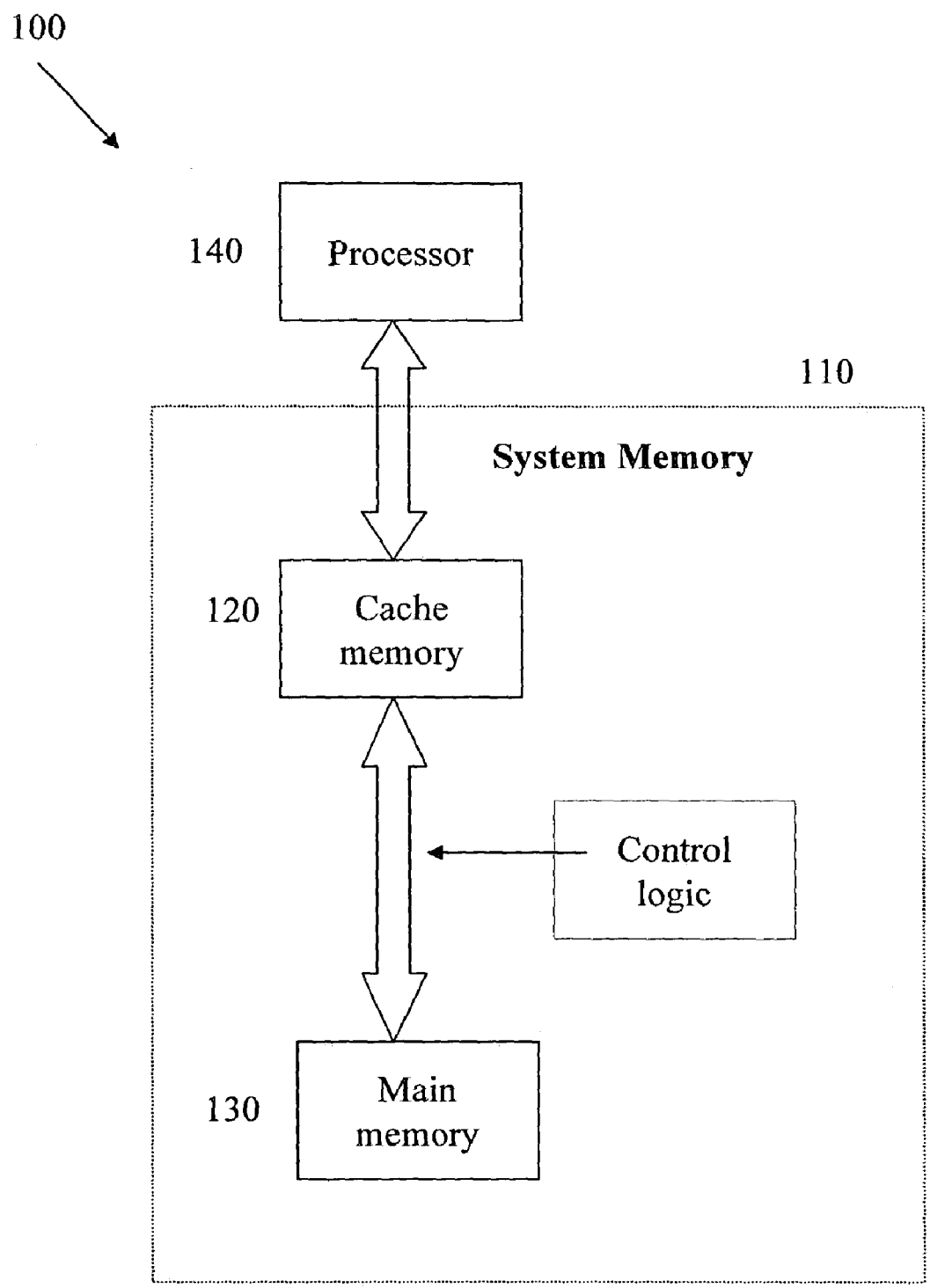
FIG. 1 illustrates a processing system in which the system memory is composed of a cache memory and a main memory.

The present invention is of a method and system for caching data in an n-way set associative memory, which can reduce the time required for main memory write operations that occur during data replacement. Specifically, the present invention can be used to improve the performance of the Least Recently Used (LRU) replacement algorithm, when used with a main memory, such as a DRAM, having a page structure.

The function of a cache memory is to reduce the time required for accessing and/or modifying data or instructions (collectively referred to below as data) from memory. Cache memories store the most recently accessed data from main memory, or other data that is expected to be required frequently. Prior to accessing main memory, the processor checks the cache memory for the required data. If the data is present in the cache (a cache hit) the main memory need not be accessed, resulting in a significant time saving.

Minimizing the time required for read and write operations to the cache memory is a crucial element of cache memory design. Cache memories generally consist of high-speed memory elements such as static random access memories (SRAM), so that simple read/write operations to the cache are very quick. However, replacing data in the cache memory may require a write operation to the main memory as well, significantly increasing the time required for the operation. The present invention is a data replacement strategy which improves cache memory speed for a data replacement operation, when the main memory has a page structure.

The principles and operation of a method and system for caching specified data in an n-way set associative memory according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 2 illustrates the organization of a 2-way set associative memory. The associative memory is organized into M rows, where the number of rows is determined by design considerations which are outside the scope of this discussion. Each of the M rows contains two ways. (In the general case of an n-way set associative memory, each row would have n ways.) The information stored in each way has several components. As described above, each way stores the data and an associated tag. Together, the row and the tag determine the main memory address of the stored data in a given way. Each way contains additional bits, such as the validity bit, which provide needed information concerning the stored data. If the copy-back method is used, a dirty bit is stored for each way. Additional indicators may also be for each way, or for each row, for example for use in determining the LRU data in the row.

Figure 3:
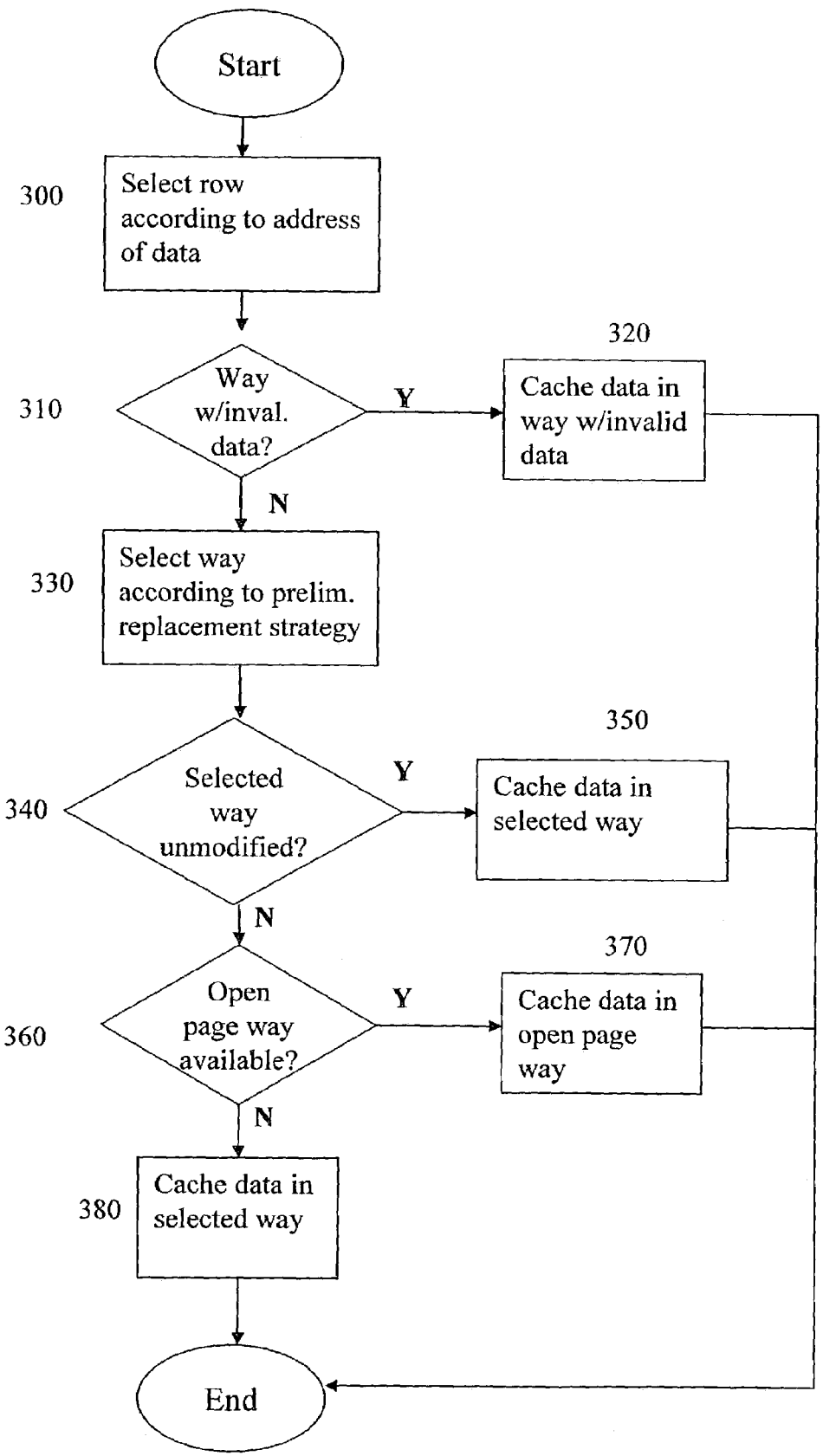
FIG. 3 is a simplified flow chart of a method for caching specified data in an n-way set associative memory, according to a preferred embodiment of the present invention.

Reference is now made to FIG. 3, which is a simplified flow chart of a method for caching specified data in an n-way set associative memory, according to a preferred embodiment of the present invention. External agents, such as a processors or input/output devices, connect to the main memory via the associative memory, which serves as a cache memory. The data being cached in the associative memory (referred to below as the specified data) may be data newly read from the main memory or data written to the main memory by an external agent. The associative memory is organized by rows, where each row has n ways, similarly to the associative memory shown in FIG. 2. Each way contains the cached data and a tag, which along with the index of the row gives the main memory address of the data. Each way may contain additional information about the stored data, such as a validity bit or a dirty bit. When using the LRU replacement algorithm as a preliminary replacement algorithm, as discussed below, information must also be present indicating the order in which the ways have been accessed, so that the LRU way can be determined. The associative memory utilizes the copy-back main memory update policy, so that the main memory is updated only when the replaced data has been modified since being stored in the associative memory.

The method begins when specified data is to be stored in the associative memory. In step 300 the index of the main memory address of the specified data is used to determine the row of the associative memory in which the specified data is to be stored. After the row is selected, the ways of the selected row are examined in step 310 in order to find a way that does not hold valid data. If one is found, in step 320 the specified data is cached in the way containing invalid data, and the method ends. Otherwise, further selection criteria are employed to select a way for data replacement, as described below.

In step 330 a preliminary replacement algorithm, such as LRU or random replacement, is used to select a way as a candidate for data replacement. The purpose of the present embodiments is to improve the performance of the preliminary replacement algorithm by adding considerations of the main memory page structure, as described in more detail below. In step 340, the way selected by the replacement algorithm is examined to see if the currently cached data has been modified since being stored in the associative memory. If the currently cached data has not been modified since it was cached (i.e. if the dirty bit is not set), the data stored in the selected way is replaced by the specified data in step 350, and the data caching process is terminated. However, if the selected way contains modified data, then under the copy-back update policy the cached data is written to the main memory before being replaced. If the cached data is not from the currently open page of main memory, updating the main memory value causes a time delay due to the precharge and activate operations that are required to close the open page and to open the new page, as explained in the background hereinabove. In order to possibly eliminate the time delay, in step 360 the ways of the selected row are examined to find a way that contains data from the currently open page. If one or more ways holding data from the currently open page are found, one of the ways holding data from the open page is selected for data replacement, and the specified data is cached in step 370. Updating the main memory does not require the precharge and activate operations, and is therefore quicker than a memory write to a closed page. The data caching process is then terminated. If there are more than one ways containing data from the open page, a second replacement strategy may be used to make a selection from amongst them, as described below. However, if none of the ways in the selected row contain data from the open page, in step 380 the specified data is cached in the way previously selected by the preliminary replacement algorithm (step 330). The data caching process then ends.

Figure 4:
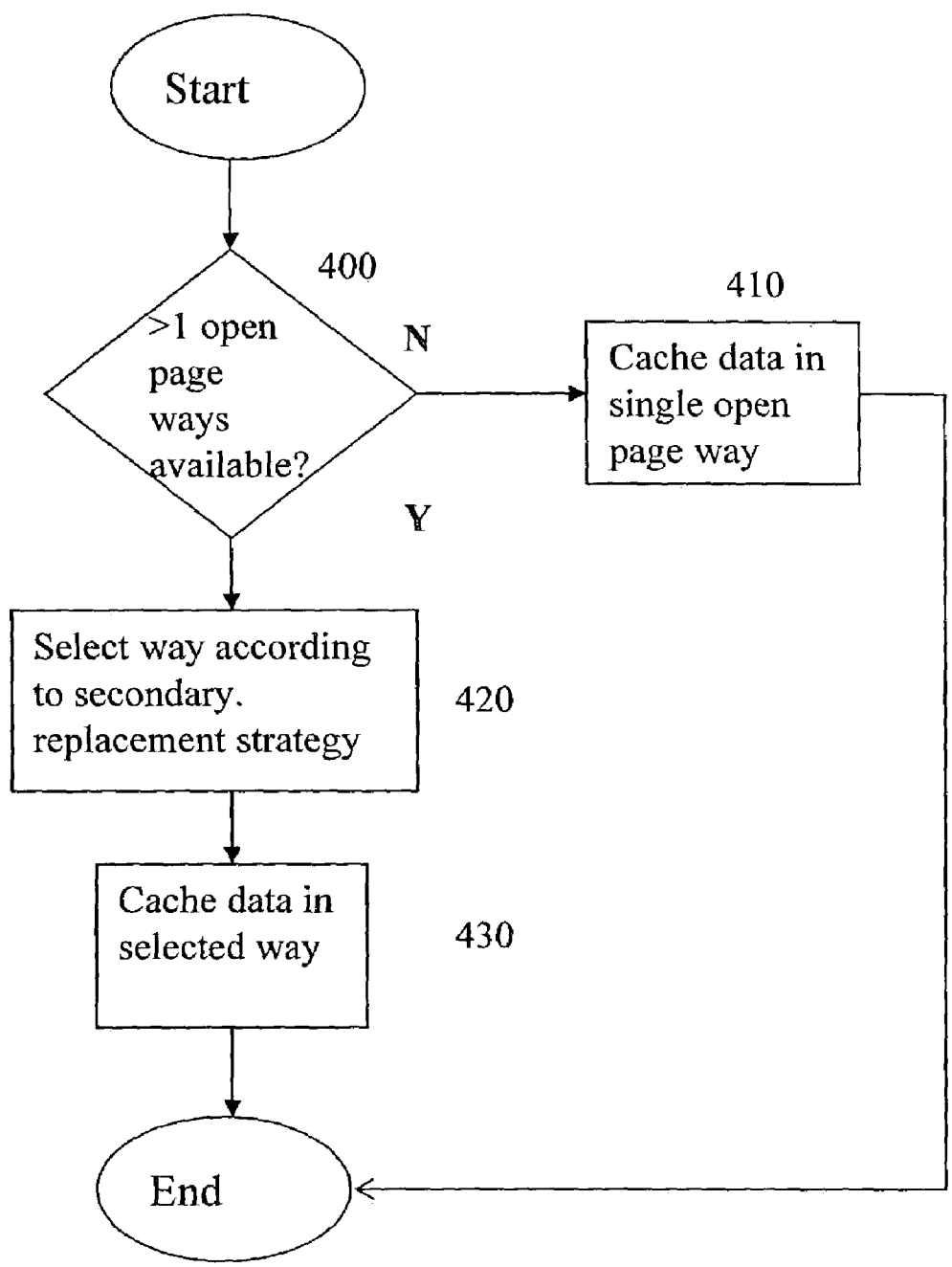
FIG. 4 is a simplified flow chart of a method for selecting between multiple ways holding data from the currently open page, according to a preferred embodiment of the present invention.

Reference is now made to FIG. 4, which is a simplified flow chart of a preferred embodiment of a method for selecting between multiple ways holding data from the currently open page, according to a preferred embodiment of the present invention. In some cases, more than one way of a given line contains data from the open main memory page, and a single way must be selected from amongst them. In step 400, the ways of the selected line are checked to determine how many contain data from the currently open page. If it is found, in step 400, that a single way holds data from the open page, the specified data is stored in the single way that was found. However, if multiple ways were found in step 400, one of these ways is selected for data replacement in step 420, using a secondary replacement strategy. In step 430, the specified data is cached in the way selected by the secondary replacement strategy. In the preferred embodiment, the secondary replacement strategy is the LRU replacement strategy, and the way selected in step 420 is the least recently used way that contains data from the open page. Note that the way selected by the current method may be the same way selected in step 370 above.

Returning to the method of FIG. 3, the preferred embodiment contains the further step of updating a current page indicator to indicate a currently open page of the main memory. The current page indicator shows which main memory page is currently open. The current page indicator can be used in step 360 to determine which ways contain data from the open page. When data from a different page is cached in step 380, the current page indicator is set to the main memory page that was opened when the replaced data was written back to main memory.

In the above method, modified data is examined to determine if its main memory address is from the currently open main memory page. Main memory pages contain sequentially addressed blocks of data. The main memory address of cached data can therefore serve as an indicator of the page it is stored on. The main memory address of the cached data may be determined from the index (as indicated by the selected row) and the tag stored with the cached data. The preferred embodiment contains the step of analyzing the tag and row of a specified way to substantially determine if the specified way contains data from the currently open page.

Preferably, the method contains the further step of locking a way. When a way is locked, the data stored in the locked way is protected against replacement by new data until the way is unlocked. Locking a way removes it from the data replacement process. The locked way is not part of the selection process of step 330, and is not examined in step 360 to determine if it contains data from the open page. The way may later be unlocked, and reenter the data replacement process. A way replacement strategy may be able to override the locked way status, and select a way for replacement even though it is currently locked.

In steps 350, 370, and 380 of the data caching method of FIG. 3, data is replaced in the cache memory. In the preferred embodiment, the data caching method contains the step of writing the replaced data to the main memory. The replaced data may first be stored in a buffer memory, and written to the main memory at a later time. The secondary selection method of FIG. 4 is particularly applicable when more than one buffer memory are used, where each buffer contains different data for later storage in the main memory. The secondary selection strategy can be used to select between the buffer memories, when different buffers contain data from the currently open page.

The preferred embodiment further contains a strategy selection step for multi-application embodiments. If the data caching may be performed for more than one application, different replacement strategies may be required for the separate applications. The method includes a step of selecting an application-specific first replacement strategy. When a secondary replacement strategy is used to select between multiple ways containing data from the open main memory page (as described for FIG. 4), the preferred embodiment preferably also contains a step of selecting an application-specific second replacement strategy.

Figure 5:
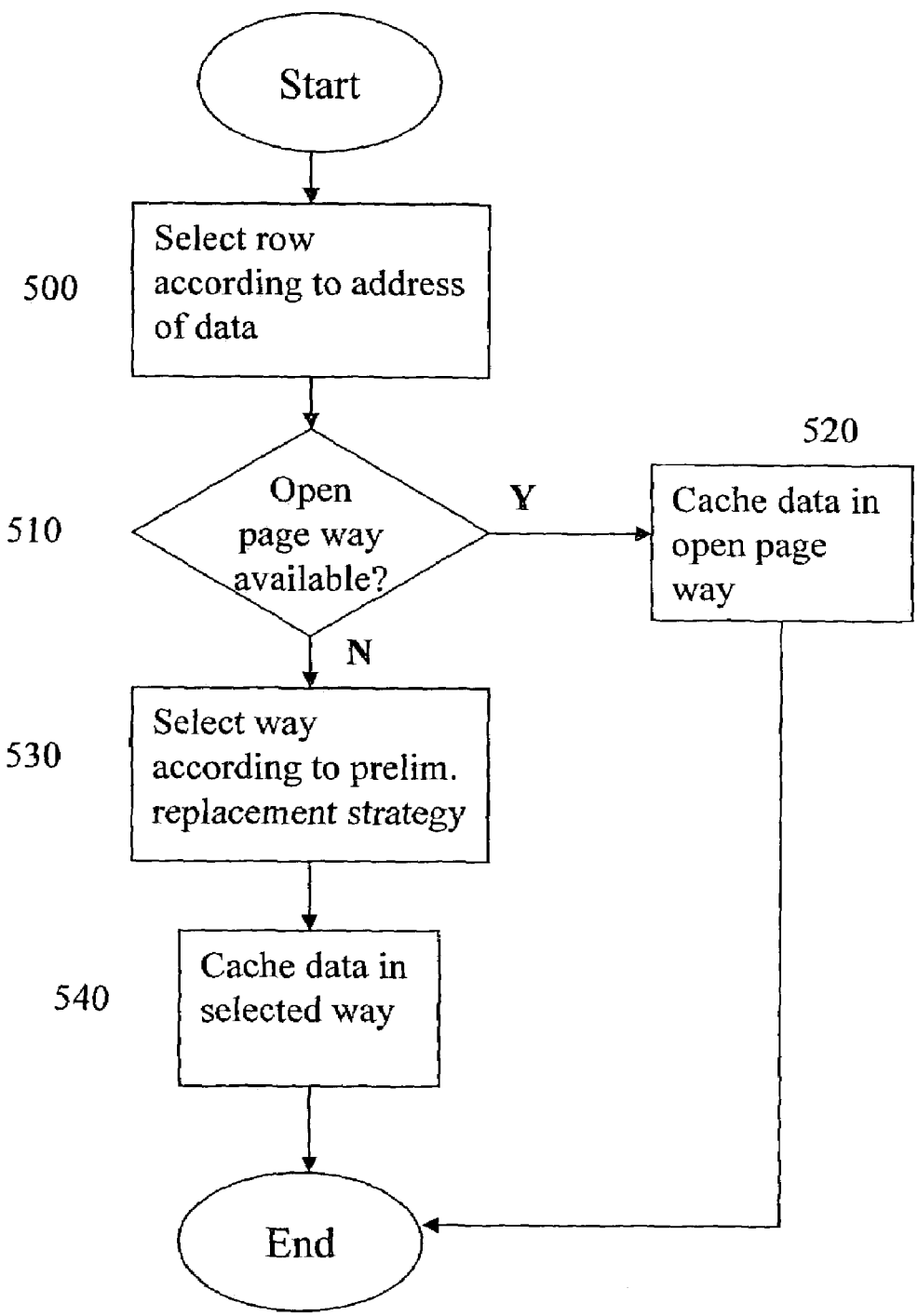
FIG. 5 is a simplified flow chart of a second method for caching specified data in an n-way set associative memory, according to a preferred embodiment of the present invention.

Reference is now made to FIG. 5, which is a simplified flow chart of a second method for caching specified data in an n-way set associative memory according to a preferred embodiment of the present invention. As above, a main memory serves for primary data storage, and the associative memory is organized by rows, where each row has n ways, and has a copy-back main memory update policy. The second method uses the open page test as the primary criterion for determining the way in which to cache the data. In step 500, a row of the associative memory is selected according to the index of the main memory address of the specified data. In order to possibly eliminate a page access time penalty, in step 510 the ways of the selected row are examined to find a way that currently contains data from the open page. If a way is found in step 510, the specified data is cached in step 520, and the data caching process is terminated. Otherwise, in step 530, a default replacement algorithm is used to select a way for replacement. In the preferred embodiment, the default replacement algorithm is the LRU algorithm, but may also include consideration of other factors, such as whether the data in the cache has been modified. In step 540, the specified data is cached in the way selected according to the replacement strategy, and the data caching process is terminated. A preliminary step may be performed, for example caching the data in a way containing invalid data, if available, prior to performing step 510.

Figure 6:
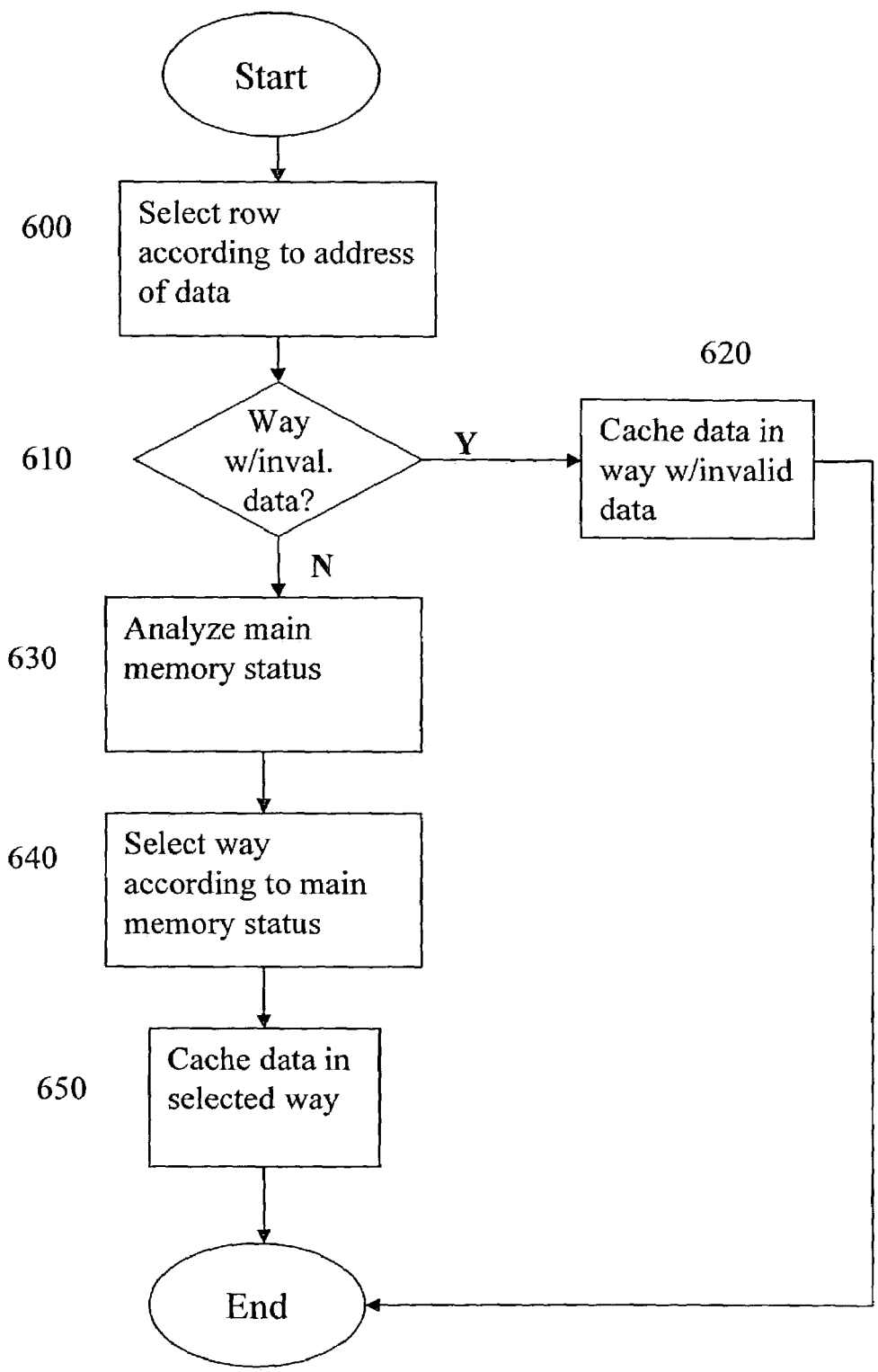
FIG. 6 is a simplified flow chart of a third method for caching specified data in an n-way set associative memory, according to a preferred embodiment of the present invention.

A third preferred embodiment of the present invention uses general considerations of main memory status to select a way for data replacement. Reference is now made to FIG. 6, which is a simplified flowchart of a method for caching specified data in an n-way set associative memory, according to the third preferred embodiment of the present invention. As above, a main memory serves for primary data storage, and the associative memory is organized by rows, where each row has n ways, and has a copy-back main memory update policy. In step 600 the index of the main memory address of the data being cached is used to determine the row of the associative memory in which the data is to be stored. The ways of the selected row are examined in step 610 in order to find a way that does not hold valid data. If one is found, in step 620 the specified data is cached in the way containing invalid data, and the method ends. In step 630 the main memory status is analyzed. The main memory status is then used, in step 640 to select one of the ways of the selected row for caching the specified data. Finally, in step 650, the specified data is cached in the way selected in step 640. Main memory status may include any main memory factors which impact the speed with which data in the associative memory can be replaced, and will depend upon the specific hardware and software of the main memory. For example in the case discussed above the main memory had a page structure, where data within the open page could be modified most quickly. Thus, for the current example, the main memory status determined in step 630 includes information about the currently open page, and in step 640 the main memory addresses of the currently cached data are examined to find data from the currently open page.

The above method can be modified for the case in which the cache memory is a fully associative memory, rather than an n-way set associative memory. The fully associative memory has a single way per row, where data can be stored on any row regardless of the main memory data address of the data. Accordingly, in the preferred embodiment for the fully associative case row selection according to the main memory address of the specified data (step 610) is not performed. Instead the way selection process (step 640) is performed on all of the ways of the associative memory, not just on the ways of a selected line as in the n-way set associative case. The method used to search the ways of the fully associative memory to identify valid/invalid data, or other desired parameters, is beyond the scope of the present embodiment.

Figure 7:
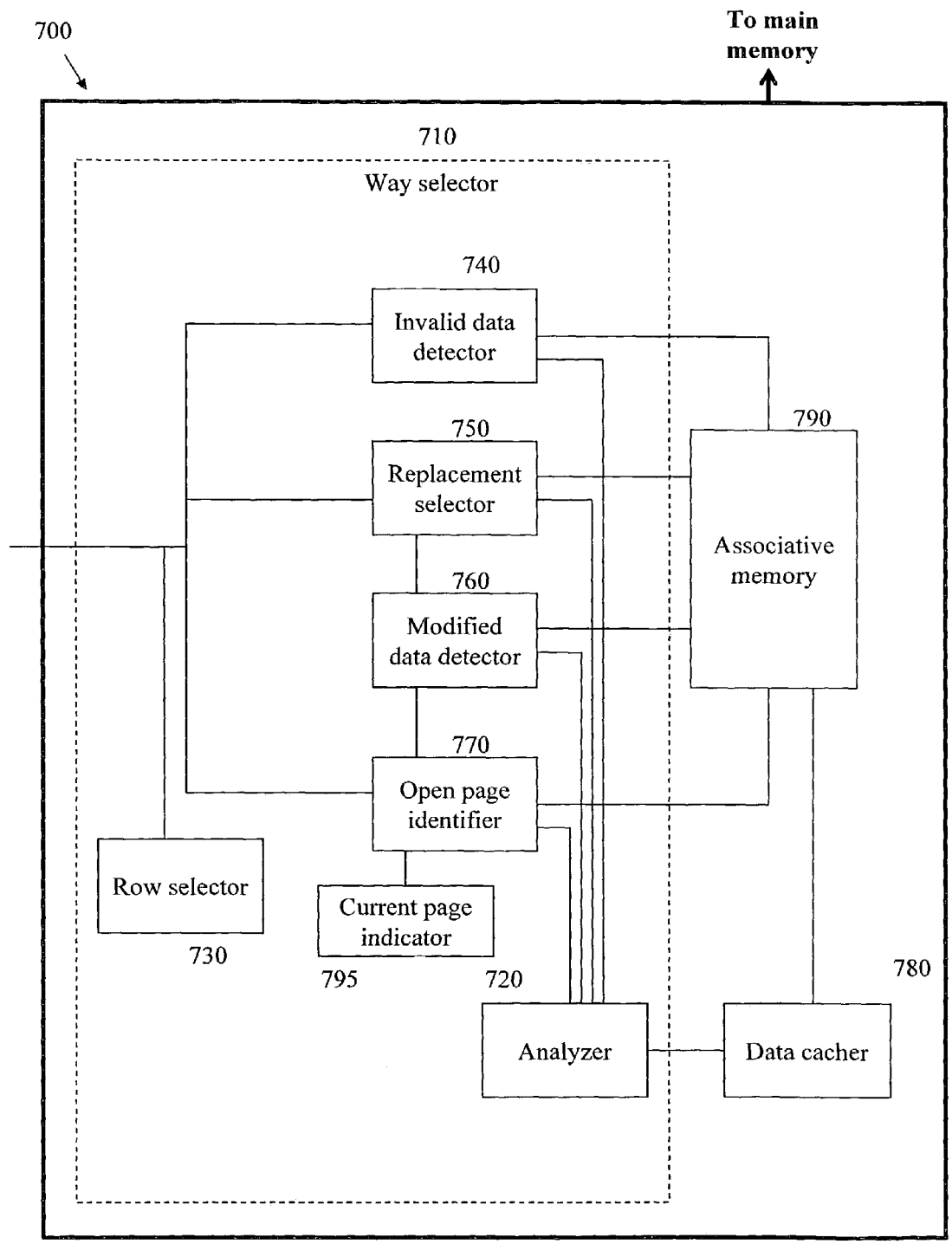
FIG. 7 is a simplified block diagram of a way selector system for selecting a way of an n-way set associative memory in which to cache specified data, according to a preferred embodiment of the present invention.

Reference is now made to FIG. 7, which is a simplified block diagram of a way selector system for selecting a way for the caching of specified data in an n-way set associative memory, according to a preferred embodiment of the present invention. The associative memory uses a copy-back replacement strategy, so that the main memory is updated only when modified data is replaced in the cache. Way selector system 700 contains a way selector 710 which consists of: analyzer 720, invalid data detector 740, replacement selector 750, and open page identifier 770. Way selector 710 may also include a row selector 730 and/or modified data detector 760. The function of the way selector 710 is to examine the associative memory 790, and to select a way in which the specified data is to be cached, according to the selection criteria described above in the method of FIG. 3. External agents, such as processors and I/O devices, connect to the main memory via the cache memory, for both reading data from the main memory and writing data to the main memory. The data being cached may be main memory data that has not yet been stored in the cache memory, or may be from external agents reading and writing main memory data via the associative memory.

Analyzer 720 supervises the way selection process. The results obtained by the additional components of the way selector 710 are transferred to analyzer 720, which analyzes the results in order to select the way that the specified data should be stored in. In the preferred embodiment, analyzer 720 also controls the other way selector components. Thus, for example, analyzer 720 determines if the additional components should perform their functions serially or in parallel.

The various way selector components may individually determine the row associated with the specified data, or the row may be selected by a dedicated component, row selector 730. Row selector 730 selects the appropriate row of the associative memory according to the main memory address of the data being cached. The way selection process is preferably performed only on the ways of the selected row.

Invalid data detector 740 examines the ways of the selected row, seeking a row that contains invalid data. In the preferred embodiment, invalid data detector 740 examines the valid bit associated with each way in the selected row. If an invalid way is found, no further examination of the associative memory is required, since analyzer 720 selects the invalid way for data replacement, regardless of the findings of other way selector components.

Replacement selector 750 examines the ways of the selected row, and selects one of the ways for replacement according to a preliminary replacement strategy, for example the LRU strategy. The way selected by replacement selector 750 is checked to see if it contains modified or unmodified data. Way selector 710 may contain a modified data detector 760, which checks a given way to determine if the data in it has been modified, or the check may be performed internally by the replacement selector 750. In the preferred embodiment, modified data detector 760 determines if a given way contains modified data by inspecting the dirty bit associated with the way.

Open page identifier 770 identifies ways in the selected row which contain data from the currently open page of main memory. If a way containing data from the open page is found, the open page identifier 770 (or modified data detector 760 if present) then determines if the way contains modified or unmodified data.

In a further preferred embodiment, open page identifier 770 contains a page detector that analyzes the main memory address of the cached data to substantially identify the main memory page associated with the specified way. The open page identifier 770 can then check if the page found by the page detector is the same as the currently open page.

In the preferred embodiment, way selector 710 also contains a current page indicator 795 that stores an indicator, such as a memory address, of the page that is currently open in the main memory. In the preferred embodiment, in order to determine if the data in a given way is from the open page, the open page identifier 770 simply compares the page information found in the current page indicator 795 to the page found by the page detector.

Analyzer 720 analyzes information obtained from the way selector components (such as the row selector 730, invalid data detector 740, replacement selector 750, modified data detector 760, and open page identifier 770), and uses the information to choose one of the n ways of the selected row for data replacement. As discussed above, analyzer 720 chooses the way for data replacement according to the following criteria (listed in descending order of preference):

1) Way with invalid data
2) Way selected by replacement algorithm and holding unmodified data
3) Way corresponding to an open page
4) Way selected by replacement algorithm and holding modified data Thus, for example, if invalid data detector 740 does not find a way containing invalid data, analyzer 720 chooses a way which was selected by replacement selector 750, and which has been found to contain unmodified data. Analyzer 720 may also include main memory access-related criteria into the way selection process, such as excluding from consideration ways containing data from main memory addresses adjacent to recently updated data.

In the preferred embodiment, way selector 710 further contains a secondary selector which implements a secondary replacement strategy in the case that the open page identifier 770 finds more than one way from the open page. The secondary selector selects one of the ways from the open page in accordance with the secondary replacement strategy. In the preferred embodiment, the secondary replacement strategy is the least recently used (LRU) replacement strategy, so that open page identifier 770 selects the least recently used of the plurality of ways from the open main memory page.

In some cases certain ways in the associative memory are locked against modification or replacement. In the preferred embodiment, way selector 710 further contains a way locker, which locks and unlocks a way, so as to prevent data caching in the way when necessary.

Preferably, way selector 710 further contains a buffer memory for storing the data replaced in the associative memory prior to writing the replaced data to the main memory.

In the preferred embodiment way selector system 700 also contains a data cacher 780. Data cacher 780 stores the specified data in the selected way of a connected associative memory device, and may perform other cache management functions.

Way selector system 700 preferably contains an n-way set associative memory 790. In the preferred embodiment, the way selector 710 chooses a way for data caching, as described above, and data cacher 780 stores the specified data in the internal associative memory 790.

In the preferred embodiment, way selector 710 further comprises a strategy selector. The strategy selector selects the first and/or second replacement strategies. The strategy selector can select different replacement strategies for different applications, enabling the same way selector system to be used for a wide variety of applications. The strategy selector may use other strategy selection criteria, either in addition to the application related criteria or independently.

Figure 8:
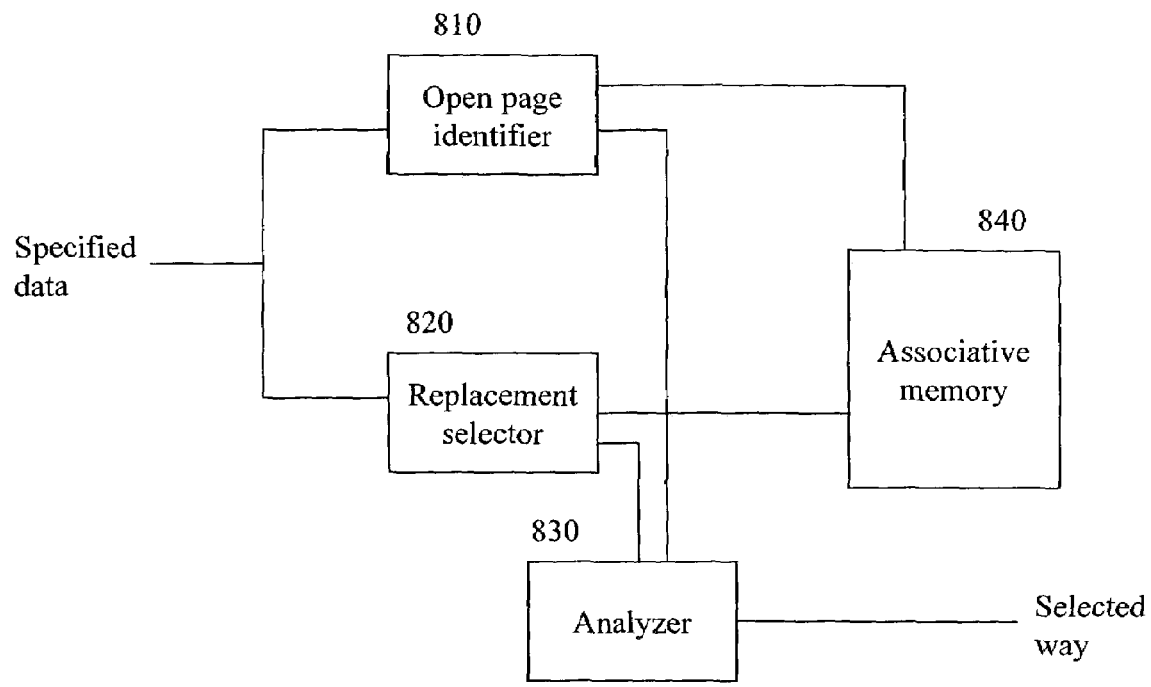
FIG. 8 is a simplified block diagram of a way selector for selecting a way in an n-way set associative memory for the caching of specified data, according to a preferred embodiment of the present invention.

Reference is now made to FIG. 8, which is a simplified block diagram of a way selector for selecting a way in an n-way set associative memory for the caching of data, according to a second preferred embodiment of the present invention. The associative memory structure and function are as described above. Way selector 800 contains open page identifier 810, replacement selector 820, and analyzer 830. Both the open page identifier 810 and the replacement selector 820 are connected to the associative memory 840. The main memory address of the data being cached determines the row of the associative memory 840 that is examined by the way selector 800. Open page identifier 810 checks the ways in the selected row to find a way that holds data from a currently open page of a main memory. Replacement selector 820 examines the same row, and selects one of the ways in the row using a default replacement strategy. Analyzer 830 uses information provided by the replacement selector 820 and the open page identifier 810 to select one of the ways in the given row, in a manner similar to the method of FIG. 5 above. The primary factor used by analyzer 830 for selecting a way for data replacement in the current preferred embodiment is to find a way which contains data from the currently open page. Other factors are considered only if no way from the currently open page is found. However, in the case where a way holding invalid data is identified in the selected row, analyzer 830 may determine that no data replacement is necessary and cache the specified data in the identified way. In the preferred embodiment, analyzer 830 first selects a way that was found by open page identifier 810 to contain data from the currently open main memory page. If none of the ways contain data from the open page, analyzer 820 selects the way chosen by replacement selector 820. Way selector 800 may also perform additional checks of the status of the data in the ways of the selected row, to provide additional information to analyzer 830. For example, the ways of the selected row may be checked to see if any contain invalid data.

Figure 9:
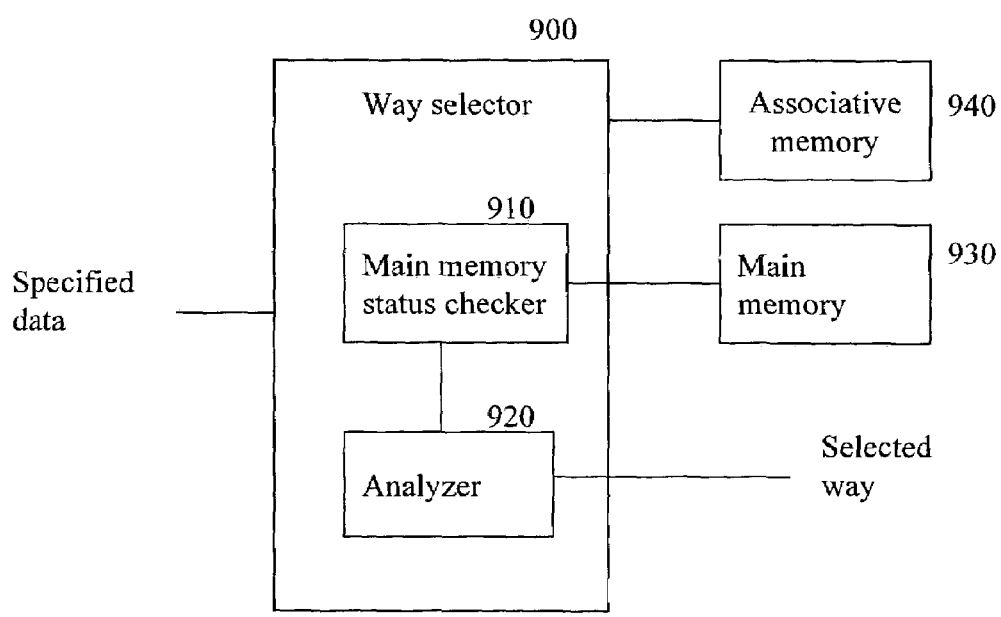
FIG. 9 is a simplified block diagram of a way selector system for selecting a way for the caching of specified data in an n-way set associative memory, according to a preferred embodiment of the present invention.

Reference is now made to FIG. 9, which is a simplified block diagram of a way selector system for selecting a way for the caching of specified data in an n-way set associative memory, according to a third preferred embodiment of the present invention. The associative memory structure and function are as described above. Way selector 900 contains a main memory status checker 910 which monitors the status of the main memory 930, and analyzer 920 which chooses one of the n ways for data replacement. The main memory address of the data being cached determines the row of the associative memory 930 that is examined by the way selector 900. Analyzer 920 selects one of the ways of the given row based on considerations of the status of the main memory 930, in a manner similar to the method of FIG. 6 above. In the current preferred embodiment general considerations of main memory operation, including both hardware and software functionality, are used to determine the main memory data which can be modified with greatest efficiency. For example, in an EDRAM main memory, data on the currently open page can be modified with greatest speed. Thus, in the case of an EDRAM main memory, the main memory status checker 910 determines the currently open page of the main memory and provides the information to the analyzer 920. Analyzer 920 then searches the ways of the selected row to locate a way holding data from the open page. If such a way is found, the data within the way is replaced by the specified data, as described in detail above.

Cache memory performance is a critical issue for many systems, and in particular for real-time time processing applications, such as digital signal processing. Cache replacement algorithms are designed to improve the cache hit rate, while minimizing, as much as possible, the time required for data storage and replacement within the cache. The abovedescribed method and system provide a cache replacement strategy which incorporates considerations of the main memory structure and status into the replacement algorithm. These considerations are described in the context of a main memory made of DRAM. The method and system described above reduce the number of page open and page close operations, thereby improving the cache memory data replacement speed and the performance of the overall system.

It is expected that during the life of this patent many relevant update policies, replacement strategies, and associative and main memory devices will be developed, and the scope of the terms update policy, replacement strategy, associative memory, and main memory is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for caching specified data of a primary storage main memory in an n-way set associative memory with a copy-back update policy, said associative memory comprising a plurality of rows, each row comprising n ways, said method comprising:
    selecting a row of said associative memory according to an address of said specified data;
    if a first way of said selected row comprises invalid data, caching said specified data in said first way and discontinuing said data caching process; and
    if all of said n ways of said selected row comprise valid data, performing the steps of:
    i. selecting a second way of said selected row according to a first predetermined replacement strategy;
    ii. if said second way comprises unmodified data, caching said specified data in said second way and discontinuing said data caching process;
    iii. if said second way comprises modified data, and if at least one of said ways comprises data from a currently open page of said main memory, caching said specified data in a way comprising data from said currently open page and discontinuing said data caching process; and
    iv. if said second way comprises modified data, and if none of said n ways of said selected row comprise data from said currently open page of said main memory, caching said specified data in said second way.

2. A method for caching specified data of a primary storage main memory in an n-way set associative memory according to claim 1, wherein said main memory comprises a DRAM (dynamic random access memory).

3. A method for caching specified data of a primary storage main memory in an n-way set associative memory according to claim 1, wherein said first predetermined replacement strategy comprises a least recently used (LRU) replacement strategy.

4. A method for caching specified data of a primary storage main memory in an n-way set associative memory according to claim 1, further comprising:
    if, in step iii, a single way of said selected row comprises data from said currently open page, caching said specified data in said single way and discontinuing said data caching process; and
    if, in step iii, a plurality of ways of said selected row comprise data from said currently open page of said main memory, performing the steps of:
    selecting a third way from amongst said plurality of ways according to a second predetermined replacement strategy;
    caching said specified data in said third way; and
    discontinuing said data caching process.

5. A method for caching specified data of a primary storage main memory in an n-way set associative memory according to claim 4, wherein said second predetermined replacement strategy comprises a least recently used (LRU) replacement strategy.

6. A method for caching specified data of a primary storage main memory in an n-way set associative memory according to claim 1, further comprising updating a current page indicator to indicate the currently open page of said main memory.

7. A method for caching specified data of a primary storage main memory in an n-way set associative memory according to claim 1, further comprising locking a way so as to prevent data caching in said locked way.

8. A2 method for caching specified data of a primary storage main memory in an n-way set associative memory according to claim 1, further comprising writing data replaced in said associative memory to said main memory.

9. A method for caching specified data of a primary storage main memory in an n-way set associative memory according to claim 1, further comprising writing data replaced in said associative memory to a buffer memory.

10. A method for caching specified data of a primary storage main memory in an n-way set associative memory according to claim 1, further comprising analyzing a tag and row of a specified way to substantially determine if said specified way comprises data from said currently open page.

11. A method for caching specified data of a primary storage main memory in an n-way set associative memory with a copy-back update policy, said associative memory comprising a plurality of rows, each row comprising n ways, said method comprising:
    i. selecting a row of said associative memory according to an address of said specified data;
    ii. if at least one of said ways comprises data from a currently open page of said main memory, caching said specified data in a way comprising data from said currently open page and discontinuing said data caching process;
    iii. if none of said n ways of said selected row comprise data from said currently open page of said main memory, performing the steps of:
    selecting a first way of said selected row according to a first predetermined replacement strategy; and
    caching said specified data in said first way.

12. A method for caching specified data of a primary storage main memory in an n-way set associative memory according to claim 11, wherein said main memory comprises a DRAM.

13. A method for caching specified data of a primary storage main memory in an n-way set associative memory according to claim 11, further comprising:
    if a second way of said selected row comprises invalid data, caching said specified data in said second way and discontinuing said data caching process.

14. A method for caching specified data of a primary storage main memory in an n-way set associative memory according to claim 11, wherein said first predetermined replacement strategy comprises a least recently used (LRU) replacement strategy.

15. A method for caching specified data of a primary storage main memory in an n-way set associative memory according to claim 11, further comprising:
if, in step ii, a single way of said selected row comprises data from said currently open page, caching said specified data in said single way and discontinuing said data caching process; and
if, in step ii, a plurality of ways of said selected row comprise data from said currently open page of said main memory, performing the steps of:
selecting a third way from amongst said plurality of ways according to a second predetermined replacement strategy;
caching said specified data in said third way; and
discontinuing said data caching process.

16. A method for caching specified data of a primary storage main memory in an n-way set associative memory according to claim 15, wherein said second predetermined replacement strategy comprises a least recently used (LRU) replacement strategy.

17. A method for caching specified data of a primary storage main memory in an n-way set associative memory according to claim 11, further comprising updating a current page indicator to indicate the currently open page of said main memory.

18. A method for caching specified data of a primary storage main memory in an n-way set associative memory according to claim 11, further comprising locking a way so as to prevent data caching in said locked way.

19. A method for caching specified data of a primary storage main memory in an n-way set associative memory according to claim 11, further comprising writing data replaced in said associative memory to said main memory.

20. A method for caching specified data of a primary storage main memory in an n-way set associative memory according to claim 11, further comprising writing data replaced in said associative memory to a buffer memory.

21. A method for caching specified data of a primary storage main memory in an n-way set associative memory according to claim 11, further comprising analyzing a tag and row of a specified way to substantially determine if said specified way comprises data from said currently open page.

22. A method for caching specified data of a primary storage main memory in an n-way set associative memory with a copy-back update policy, said associative memory comprising a plurality of rows, each row comprising n ways, associative data storage, said method comprising:
selecting a row of said associative memory according to an address of said specified data;
if a first way of said selected row comprises invalid data, caching said specified data in said first way and discontinuing said data caching process; and
if all of said n ways of said selected row comprise valid data, performing the steps of:
i. analyzing said main memory to determine a main memory status, including determining a currently open page of said main memory;
ii. selecting a second way of said selected row for caching in accordance with said main memory status; and
iii. caching said specified data in said second way.

23. A method for caching specified data of a primary storage main memory in an n-way set associative memory according to claim 22, wherein said main memory comprises a DRAM.

24. A way selector system, comprising a way selector for selecting a way for the caching specified data of a primary storage main memory in an n-way set associative memory with a copy-back update policy, said associative memory comprising a plurality of rows, each row comprising n ways, wherein said associative memory comprises a fast memory for caching main memory data for easy external access, and wherein said specified data for caching originates from said main memory and from external agents connected to said main memory via said associative memory, said way selector comprising:
a main memory status checker, for monitoring main memory status, and determining a currently open page of said main memory; and
an analyzer, associated with said main memory status checker, for choosing one of said n ways for data replacement.

25. A way selector system, comprising a way selector for selecting a way for the caching of specified data of a primary storage main memory in an n-way set associative memory with a copy-back update policy, said associative memory comprising a plurality of rows, each row comprising n ways, wherein said associative memory comprises a fast memory for caching main memory data for easy external access, and wherein said specified data for caching originates from said main memory and from external agents connected to said main memory via said associative memory, said way selector comprising:
an invalid data detector, for detecting a way of a selected row comprising invalid data;
a replacement selector, for selecting a way of said selected row according to a first predetermined replacement strategy;
an open page identifier, for identifying a way of said selected row comprising data from a currently open page of a main memory; and
an analyzer, associated with said invalid data detector, said replacement selector, said modified data detector, and said open page identifier, for choosing one of said n ways for data replacement.

26. A way selector system according to claim 25, wherein said main memory comprises a DRAM.

27. A way selector system according to claim 25, further comprising a row selector, for selecting a row of said associative memory according to an address of said specified data.

28. A way selector system according to claim 25, further comprising a modified data detector, for detecting if a way of said selected row comprises modified data.

29. A way selector system according to claim 25, wherein said open page identifier comprises a page detector for analyzing a tag and row of a specified way to determine a main memory page associated with data stored in said way.

30. A way selector system according to claim 25, further comprising a current page indicator for indicating the currently open page of said main memory.

31. A way selector system according to claim 25, further comprising a secondary selector for selecting a way from amongst a plurality of ways comprising data from said currently open page of said main memory according to a second predetermined replacement strategy.

32. A way selector system according to claim 25, wherein said first predetermined replacement strategy comprises a least recently used (LRU) replacement strategy.

33. A way selector system according to claim 31, wherein second predetermined replacement strategy comprises a least recently used (LRU) replacement strategy.

34. A way selector system according to claim 25, comprising a way locker for locking a way so as to prevent data caching in said locked way.

35. A way selector system according to claim 25, comprising a data cacher for caching said specified data in said chosen way of said selected row.

36. A way selector system according to claim 25, comprising an n-way set associative memory.

37. A way selector system according to claim 25, comprising a buffer memory for storing the data replaced in said associative memory prior to writing said replaced data to said main memory.

38. A way selector system according to claim 25, further comprising strategy selector for selecting an application-specific first replacement strategy.

39. A way selector system according to claim 38, wherein said strategy selector is further operable to select an application-specific second replacement strategy.

40. A way selector system, comprising a way selector for selecting a way for the caching of specified data of a primary storage main memory in an n-way set associative memory with a copy-back update policy, said associative memory comprising a plurality of rows, each row comprising n ways, wherein said associative memory comprises a fast memory for caching main memory data for easy external access, and wherein said specified data for caching originates from said main memory and from external agents connected to said main memory via said associative memory, said way selector comprising:
   an open page identifier, for identifying a way of a selected row comprising data from a currently open page of said main memory;
   a replacement selector, for selecting a way of said selected row according to a predetermined replacement strategy; and
   an analyzer, associated with said replacement selector and said open page identifier, for choosing one of said n ways for data replacement.

41. A method for caching specified data of a primary storage main memory in an n-way set associative memory with a copy-back update policy, said associative memory comprising a plurality of rows, each row comprising n ways, said method comprising:
   selecting an application-specific first replacement strategy;
   selecting a row of said associative memory according to an address of said specified data;
   if a first way of said selected row comprises invalid data, caching said specified data in said first way and discontinuing said data caching process; and
   if all of said n ways of said selected row comprise valid data, performing the steps of:
   i. selecting a second way of said selected row according to said first replacement strategy;
   ii. if said second way comprises unmodified data, caching said specified data in said second way and discontinuing said data caching process;
   iii. if said second way comprises modified data, and if at least one of said ways comprises data from a currently open page of said main memory, caching said specified data in a way comprising data from said currently open page and discontinuing said data caching process; and
   iv. if said second way comprises modified data, and if none of said n ways of said selected row comprise data from said currently open page of said main memory, caching said specified data in said second way.

42. A method for caching specified data of a primary storage main memory in an n-way set associative memory according to claim 41, further comprising selecting an application-specific second replacement strategy.

43. A method for caching specified data of a primary storage main memory in an n-way set associative memory according to claim 42, further comprising:
   if, in step iii, a single way of said selected row comprises data from said currently open page, caching said specified data in said single way and discontinuing said data caching process; and
   if, in step iii, a plurality of ways of said selected row comprise data from said currently open page of said main memory, performing the steps of:
   selecting a third way from amongst said plurality of ways according to a second replacement strategy;
   caching said specified data in said third way; and
   discontinuing said data caching process.

* * * * *